(12) United States Patent
Hanson (10) Patent No.: US 8,546,757 B2
(45) Date of Patent: Oct. 1, 2013

(54) PIXEL STRUCTURE FOR MICROBOLOMETER DETECTOR

(75) Inventor: Charles M. Hanson, Richardson, TX (US)

(73) Assignee: L-3 Communications Corporation, New York, NY (US)

( * ) Notice: Subject to any disclaimer, the term of this patent is extended or adjusted under 35 U.S.C. 154(b) by 110 days.

(21) Appl. No.: 12/799,627

(22) Filed: Apr. 28, 2010

(65) Prior Publication Data

US 2011/0266444 A1 Nov. 3, 2011

(51) Int. Cl.
*G01J 5/20* (2006.01)

(52) U.S. Cl.
USPC ................................ 250/338.4; 250/338.1

(58) Field of Classification Search
USPC ........................... 250/338.4, 338.1
See application file for complete search history.

(56) References Cited

U.S. PATENT DOCUMENTS

| | | | |
|---|---|---|---|
| 5,228,777 A | 7/1993 | Rosencher et al. | |
| 5,760,398 A * | 6/1998 | Blackwell et al. | 250/332 |
| 5,825,029 A | 10/1998 | Agnese et al. | |
| 6,225,629 B1 | 5/2001 | Ju | |
| 6,690,014 B1 | 2/2004 | Gooch et al. | |
| 6,777,681 B1 | 8/2004 | Schimert et al. | |
| 7,459,686 B2 | 12/2008 | Syllaios et al. | |
| 2003/0209668 A1 | 11/2003 | Tohyama | |
| 2006/0060786 A1 * | 3/2006 | Vilain | 250/338.1 |
| 2006/0208189 A1 * | 9/2006 | Vilain | 250/339.04 |
| 2007/0069133 A1 | 3/2007 | DeWames et al. | |
| 2007/0170363 A1 * | 7/2007 | Schimert et al. | 250/353 |
| 2010/0133536 A1 * | 6/2010 | Syllaios et al. | 257/53 |
| 2011/0266444 A1 * | 11/2011 | Hanson | 250/338.4 |

OTHER PUBLICATIONS

Search Report, PCT/US2011/000658, Nov. 28, 2011, 3 pgs.

* cited by examiner

*Primary Examiner* — Christine Sung
(74) *Attorney, Agent, or Firm* — Egan, Peterman & Enders LLP (57) ABSTRACT

Microbolometer pixel structures including membrane material in a current path between at least two spaced electrodes, the membrane material having multiple openings defined in the current path that are configured such that substantially the entire volume of electrically conductive membrane material in at least a portion of the current path contributes to conduction of current between the electrical contacts.

24 Claims, 9 Drawing Sheets

PIXEL STRUCTURE FOR MICROBOLOMETER DETECTOR

The Government may have rights in this invention pursuant to DARPA Technology Investment Agreement NBCH3060001.

FIELD OF THE INVENTION

This invention relates generally to detectors, and more particularly to pixel structures for microbolometer detectors.

BACKGROUND OF THE INVENTION

Infrared (IR) detectors are often utilized to detect fires, overheating machinery, planes, vehicles, people, and any other objects that emit thermal radiation. Infrared detectors are unaffected by ambient light conditions or particulate matter in the air such as smoke or fog. Thus, infrared detectors have potential use in night vision and when poor vision conditions exist, such as when normal vision is obscured by smoke or fog. IR detectors are also used in non-imaging applications such as radiometers, gas detectors, and other IR sensors.

A variety of infrared detector types have been developed in the past. Many include a focal plane array (FPA) that includes a substrate with a plurality of detector elements that each correspond to a respective pixel. The substrate includes integrated circuitry which is electrically coupled to other components of the detector elements, and which is commonly known as a read out integrated circuit (ROIC).

Infrared detectors generally operate by detecting the differences in thermal radiance of various objects in a scene. That difference is converted into an electrical signal which is then processed. Microbolometers are infrared radiation detector elements that are fabricated on a substrate material using traditional integrated circuit fabrication techniques. Microbolometer detector arrays consist of thin, low thermal mass, thermally isolated, temperature-dependent resistive membrane pixel structures. The microbolometer pixel structures are suspended over silicon ROIC wafers by long thermal isolation legs in a resonant absorbing quarter-wave cavity design.

Figure 1A:
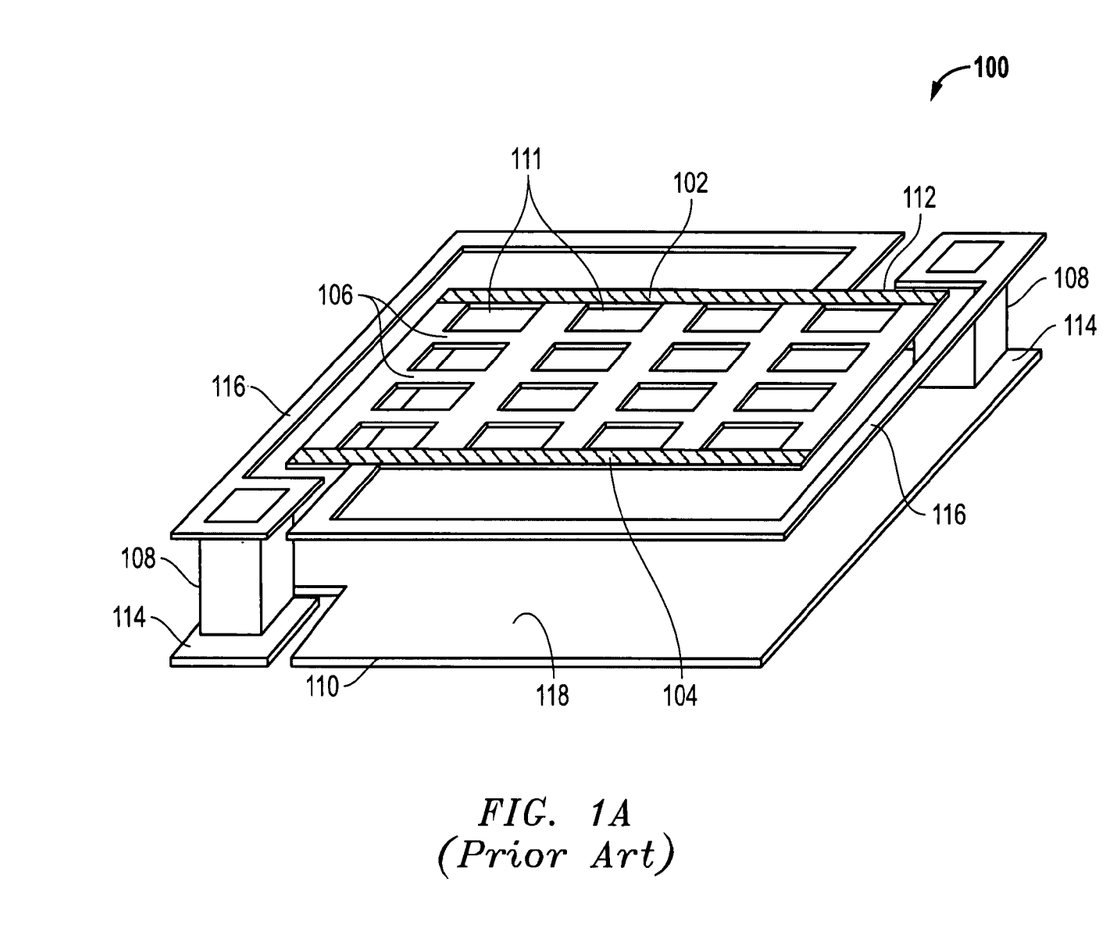
FIG. 1A illustrates a perspective view of a conventional prior art infrared detector element.

FIG. 1A illustrates a conventional prior art infrared detector element 100 with a microbolometer pixel membrane structure 112 that includes thin (1000 A to 4000 A) thermally absorbing membrane material of a resistive material like amorphous silicon (a-Si); amorphous silicon geranium (a-SiGe); or Vanadium Oxide together with an infrared absorbing thin metal like Ti, TiAl; TiN; or Ni and supporting silicon nitride, silicon oxide; or silicon oxynitride. The microbolometer pixel membrane structure 112 is suspended approximately 2 microns above silicon semiconductor substrate 110 by long thermal isolation legs 116 that are electrically connected to the ROIC within semiconductor substrate 110 by metal interconnects (typically TiW or Aluminum) via aluminum input pads 114. Disposed on the surface of the supporting substrate 110 and ROIC is a metal reflector 118 (typically Aluminum) to form a resonant cavity structure to enhance infrared absorptance in the membrane of the suspended microbolometer pixel structure 112. For infrared applications, pixel size typically ranges from 12 um×12 um up to 100 um×100 um.

The primary factors affecting response time and sensitivity of microbolometers are thermal mass and thermal isolation. Microbolometer response time is the time necessary for a detector element to absorb sufficient infrared radiation to alter an electrical property, such as resistance, of the detector element and to dissipate the heat resulting from the absorption of the infrared radiation. Microbolometer sensitivity is determined by the amount of infrared radiation required to cause a sufficient change in an electrical property of the microbolometer detector element. Microbolometer response time is inversely proportional to both thermal mass and thermal isolation. Thus, as thermal mass increases, response time becomes slower since more infrared energy is needed to sufficiently heat the additional thermal mass in order to obtain a measurable change in an electrical property of the microbolometer detector element. Therefore, it is generally desirable to make microbolometer pixels that are low in mass in order to achieve a short thermal time constant, while at the same time maximizing absorption of radiation.

Figure 1B:
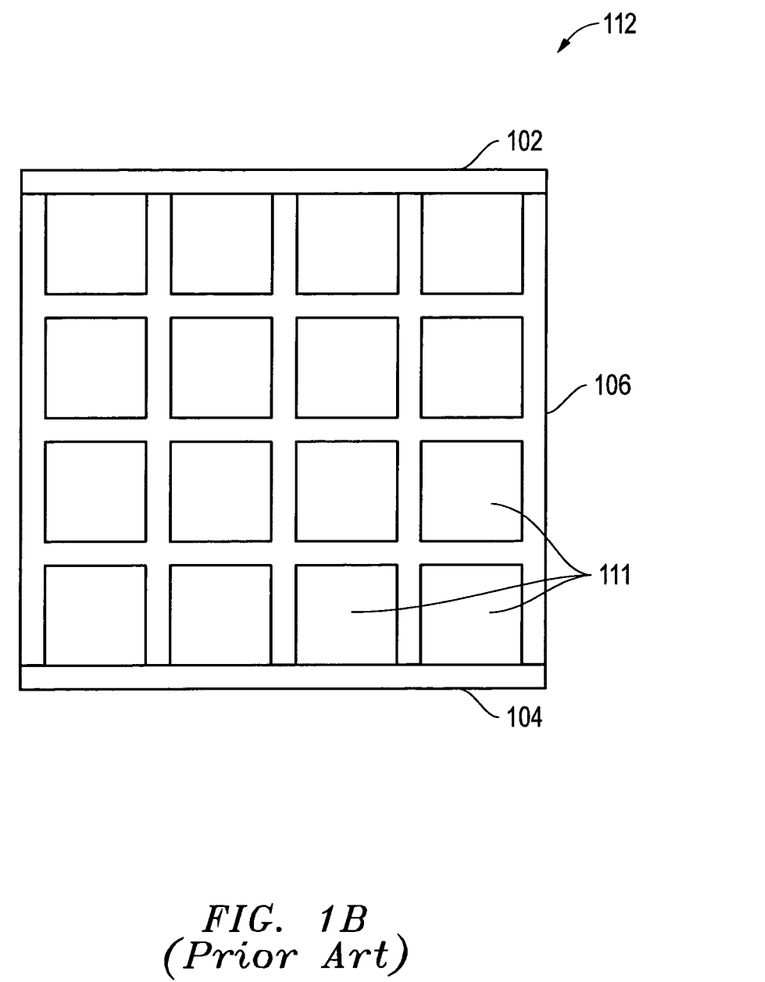
FIG. 1B is a simplified top view of a conventional microbolometer detector element pixel structure.

In the past, material has been removed from a microbolometer pixel membrane structure in a square or rectangular grid pattern to reduce microbolometer pixel mass and to shorten thermal time constant while maintaining good radiation absorption characteristics. FIG. 1B illustrates a simplified perspective view of the prior art suspended microbolometer detector pixel structure 112 of FIG. 1 that includes conductive element portions 106 that are oriented both parallel and orthogonal to the path of current flow between electrical contacts 102 and 104. As illustrated, openings in the form of square holes 111 are defined by material removed between the electrical contacts 106 to reduce the microbolometer pixel mass. The holes are dimensioned to be small compared to the radiation wavelength of interest. Microbolometer pixels fabricated with this structure are sometimes called diffractive resonant cavities (DRCs).

SUMMARY OF THE INVENTION

Disclosed herein are microbolometer pixel structures and methods for dimensioning same that result in increased volume of electrically-active conductive material disposed in-between electrical contacts of a suspended microbolometer detector pixel structure having one or more openings defined in a membrane thereof, such as a DRC microbolometer pixel structure. In this regard, geometry of microbolometer structure openings may be configured to provide greater electrically active conductive element volume per overall volume of conductive element material in the current path between the electrical contacts of the disclosed microbolometer pixel structures as compared to conventional microbolometer pixel structures such as illustrated in FIG. 1. Advantageously, increasing the portion of electrically-active material in the microbolometer structure current path acts to decrease 1/f noise of the microbolometer.

Unlike prior art conductive element portions 106 of FIGS. 1A and 1B that are oriented orthogonal with respect to one another (i.e., with some element portions 106 lying parallel to the overall direction of current flow between electrical contacts 102 and 104 and others lying perpendicular to this overall direction of current flow), the disclosed microbolometer pixel structures may be configured in one exemplary embodiment with adjacent and intersecting conductive element portions that are each oriented at substantially the same acute angle (i.e., angle less than 90 degrees) to the overall direction of current flow between the electrical contacts of a microbolometer pixel structure. In such an embodiment, substantially all of the conductive element portions and therefore substantially all of the conductive element volume of the disclosed microbolometer pixel membrane structures may be electrically active to provide a current path between the electrical contacts of the microbolometer.

Advantageously, in one disclosed embodiment, each of the conductive element portions of a suspended microbolometer pixel membrane structure may be oriented diagonally to the direction of the current flow between the microbolometer electrical contacts, such that substantially all conducive material volume of a membrane grid structure may be made electrically active. One exemplary embodiment of the disclosed microbolometer structures may be implemented in a DRC pixel configuration with increased sensitivity in which thermal isolation of the pixel is increased concomitantly with the decrease in physical mass that results from material removed from the microbolometer pixel membrane structure and in which the electrically-active volume of conductive material in the membrane structure is reduced proportionally with the decrease in physical volume of the membrane structure. Thus, the thermal isolation may be increased in the same proportion as the mass of the suspended microbolometer pixel membrane structure is reduced without degrading the thermal time constant beyond its original value and such that the electrically-active volume of conductive material is not reduced in greater proportion than the physical volume. This advantageously helps minimize any increase in 1/f noise.

In one respect, disclosed herein is a detector element, including: a substrate including read out integrated circuitry (ROIC); and a microbolometer pixel structure configured to absorb radiation. The microbolometer pixel structure may include at least two spaced electrical contacts coupled to the ROIC, and an electrically conductive membrane material supported at a position spaced above the substrate and coupled to form a current path between the two spaced electrical contacts, the membrane material having multiple openings defined therein in the current path between the two spaced electrodes, and the openings configured such that substantially the entire volume of electrically conductive membrane material in at least a portion of the current path contributes to conduction of current between the electrical contacts.

In another respect, disclosed herein is a microbolometer pixel structure configured to absorb radiation, the microbolometer pixel structure including: at least two spaced electrical contacts configured for coupling to read out integrated circuitry (ROIC) of a detector; and an electrically conductive membrane material coupled to form a current path between the two spaced electrical contacts, the membrane material having multiple openings defined therein in the current path between the two spaced electrodes, and the openings configured such that substantially the entire volume of electrically conductive membrane material in at least a portion of the current path contributes to conduction of current between the electrical contacts.

In another respect, disclosed herein is a method of making a focal plane array assembly, including: providing a substrate that includes read out integrated circuitry (ROIC); forming a plurality of detectors on the substrate, each of the detectors including a microbolometer pixel structure including at least two spaced electrical contacts coupled to the ROIC and an electrically conductive membrane material supported at a position spaced above the substrate and coupled to form a current path between the two spaced electrical contacts; and forming multiple openings in the membrane structure of each of the plurality of microbolometer pixel structures. The multiple openings being formed in the current path between the two spaced electrodes of each respective microbolometer pixel structure may be configured such that substantially the entire volume of electrically conductive membrane material in at least a portion of the current path of each respective microbolometer pixel structure contributes to conduction of current between the electrical contacts of the respective microbolometer pixel structure.

DESCRIPTION OF ILLUSTRATIVE EMBODIMENTS

Figure 2:
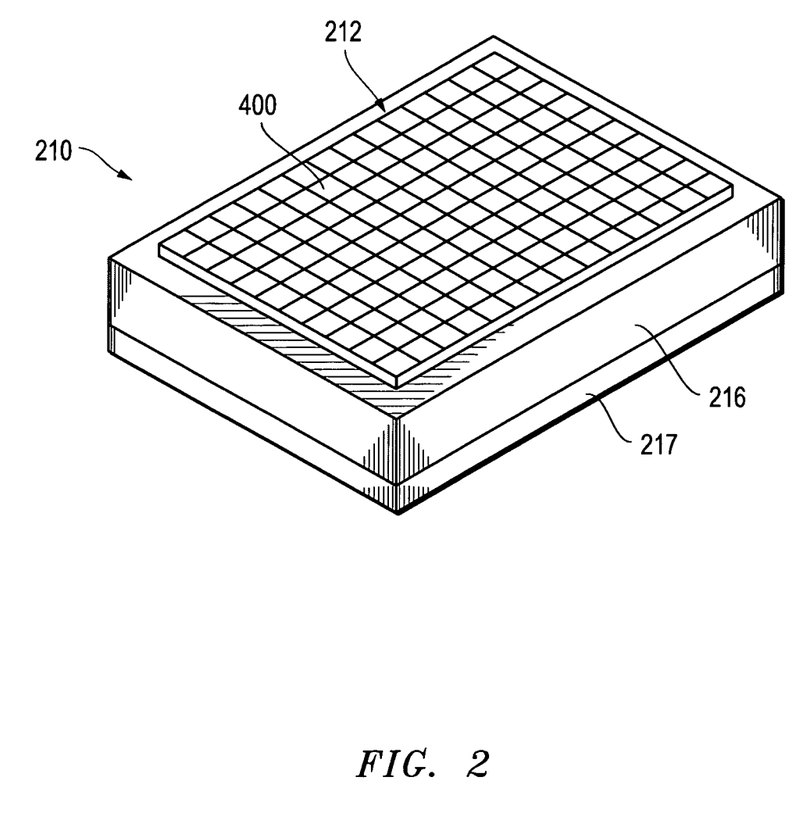
FIG. 2 is a perspective view of an infrared detector according to one exemplary embodiment.

FIG. 2 is a diagrammatic perspective view of an IR detector 210 which may be configured according to one exemplary embodiment to sense thermal energy and output electrical signals representative of a two-dimensional image of that sensed thermal energy. In this embodiment, the IR detector 210 includes a focal plane array (FPA) 212 disposed on a substrate 216. The substrate 216 includes read out integrated circuitry (ROIC). The ROIC may be configured to integrate thermally induced electrical signals from the suspended microbolometer detector element pixel structure of each IR detector element 400 in the focal plane array 212. As further shown in FIG. 2, an optional thermal element 217 (e.g., active heat sink) may be provided on the side of the substrate 216 opposite from the focal plane array 212, in order to serve as a form of controlled heat sink which may be used, for example, to maintain the operating temperature of integrated circuit substrate 216 within a temperature range which may be predefined. However, it will be understood that thermal element 217 does not have to be present, and that no form of temperature stabilization is required.

In one exemplary embodiment, the focal plane 212 may include a plurality of IR detector elements 400 that are arranged in a two-dimensional array, with each detector element 400 corresponding to a respective pixel in each image detected by the IR detector 210. In one exemplary configuration, focal plane array 212 may include 76,800 IR detector elements 400, which are arranged in a 320 by 240 array, although a focal plane array may be of any other size depending as needed or desired for a particular application, e.g., ranging in size from greater than or equal to an 80×60 array up to megapixel-sized arrays. For clarity, however, FIG. 2 diagrammatically depicts only about 140 detector elements. It will be recognized that the total number of detector elements 400 in the focal plane array 212 may be larger or smaller. FIG. 2 shows the detector elements 400 arranged in a two-dimensional array. Examples of two-dimensional array configurations include, but are not limited to, arrays having a shape that is rectangular, octagonal, hexagonal, circular, etc. It will be understood that detector elements may alternatively be arranged in a one-dimensional (e.g., straight or curved line of mono-pixels) array, or may be provided at arbitrary locations that do not conform to a specific pattern. Examples of IR detectors and focal plane array technology with which the disclosed microbolometer pixel structures may be implemented may be found in U.S. Pat. No. 7,459,686; U.S. Pat. No. 6,777,681; and U.S. Pat. No. 6,690,014, each of which is incorporated herein by reference in its entirety.

Figure 3:
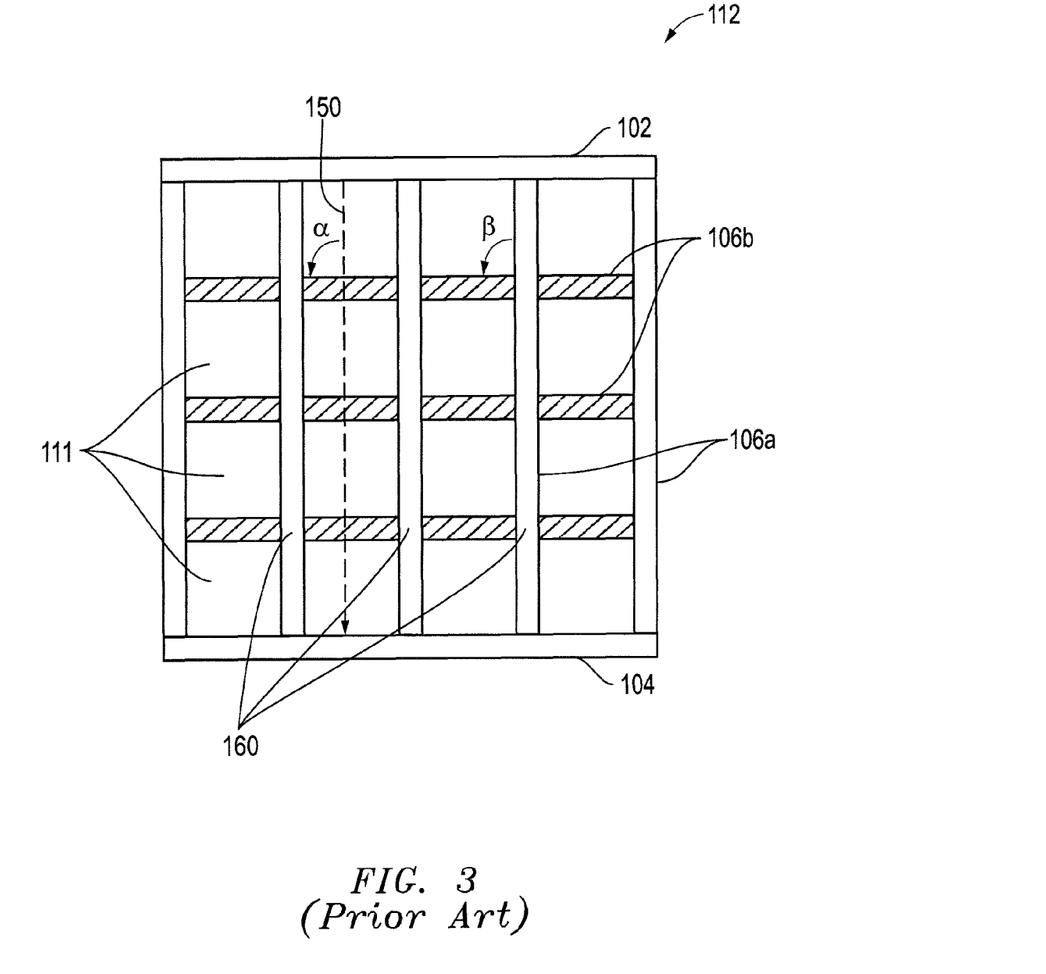
FIG. 3 is a simplified top view of a conventional microbolometer detector element pixel structure.

FIG. 3 illustrates current flow through conductive element portions 106 of prior art microbolometer detector pixel structure 100 that are oriented parallel and orthogonal to the path of current flow between electrical contacts 102 and 104. As shown, the longitudinal axis of each conductive element portion 106a is oriented parallel to the overall direction of current flow 150 between electrical contacts 102 and 104, and the longitudinal axis of each conductive element (cross member) portion 106b is oriented perpendicular (i.e., at an angle α of 90 degrees) to the overall direction of current flow 150 between electrical contacts 102 and 104. Conductive element cross member portions 106b are therefore oriented perpendicular to other conductive element portions 106a (i.e., angle between each conductive element portion 106a and each conductive element cross member portion 106b is 90 degrees). Due to this configuration, the volume of conductive material of each conductive element cross member portion 106b is at equal electrical potential across its distance between adjacent conductive element portions 106a. Further, one of multiple current paths from each intersection node 160 to each one of electrical contacts 102 or 104 has less electrical resistance than any other alternative path and therefore preferentially conducts current between the node 160 and a respective one of contacts 102 or 104. Therefore, cross member portions 106b contribute little, if any, to the electrically-active volume of conductive membrane material in the current path between the electrical contacts 102 and 104 because they connect points of equal electrical potential relative to the current path such that substantially no current flows through them as indicated by cross hatched area in FIG. 3.

The ratio of electrically active conductive element volume (i.e., volume of conductive element portions 106a) to the total volume of conductive element material in the microbolometer membrane current path between the electrical contacts 102 and 104 of illustrated prior art microbolometer structure 100 (i.e., total volume of conductive element portions 106a and conductive cross element cross member portions 106b) is about 0.68 (or, less than about 70% of the total conductive element volume is electrically active). Thus, in the prior art configuration of FIGS. 1 and 3, the actively conducting volume of conductive material is substantially less than the total physical volume of conductive material and, since 1/f noise varies inversely with square root of the number of conducting electronic carriers (or fraction of electrically-conductive material) in the volume, there is a significant penalty. Presence of such cross-hatched electrically-inactive conductive cross member portions 106b of the prior art microbolometer pixel structure 100 act to exacerbate or further increase any 1/f noise that is already inherent to a suspended microbolometer pixel membrane structure having reduced volume of electrically-active material due to the removal of electrically-conductive material to form holes or open spaces in the membrane structure.

Figure 4A:
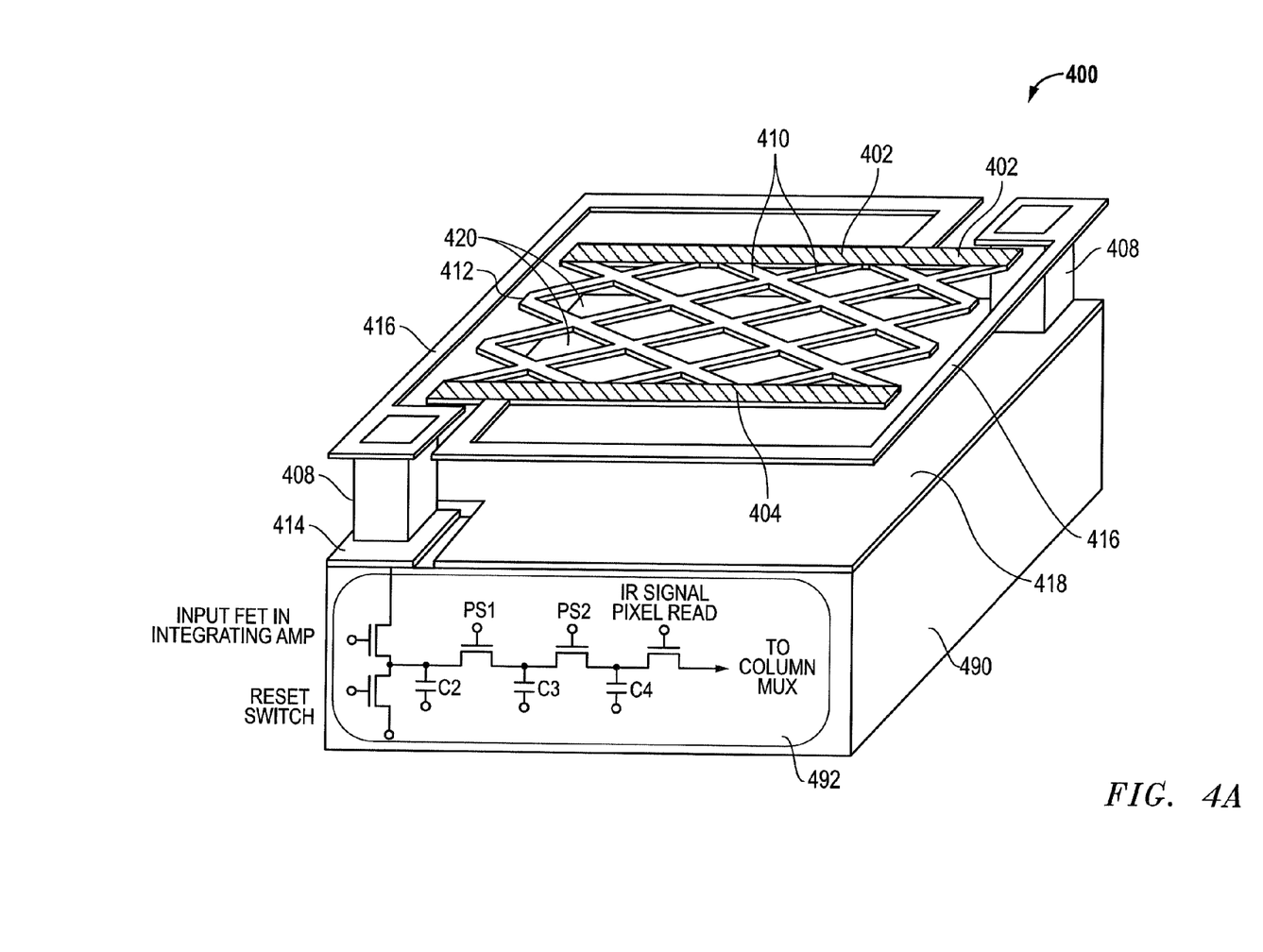
FIG. 4A is a simplified perspective view of an infrared detector element according to one exemplary embodiment.

FIG. 4A illustrates an uncooled infrared detector element 400 with a microbolometer pixel membrane structure 412 that may include thin (e.g., 1000 Angstrom to 4000 Angstrom or other suitable thickness) thermally absorbing membrane material of a resistive material like amorphous silicon (a-Si); amorphous silicon geranium (a-SiGe); or Vanadium Oxide (VOx) together with an infrared absorbing thin metal like titanium (Ti), titanium-aluminum (TiAl); titanium nitride (TiN); or nickel (Ni) and supporting silicon nitride (SiN), silicon oxide; or silicon oxynitride. In one particular exemplary embodiment, pixel membrane structure 412 may be a five layer stack including a layer of a-Si sandwiched between SiN insulator layers that is coated with a intermediate layer of TiAl and a top layer of SiN. In such an exemplary embodiment, electrodes 402, 404 may each be a four layer stack including an a-Si layer sandwiched between a SiN bottom layer and a TiAl intermediate layer, with a top layer of SiN. Although an exemplary infrared detector element is illustrated in FIG. 4A, it will be understood that the disclosed pixel structures may also be implemented in other types of bolometer detectors, e.g., millimeter wave detectors, microwave detectors, radar detectors, etc.

Still referring to FIG. 4A, the microbolometer pixel membrane structure 412 may be suspended (e.g., by approximately 2 microns or other suitable distance) above silicon semiconductor substrate 490 by thermal isolation legs 416 that are electrically connected to ROIC 492 of semiconductor substrate 490 by metal interconnects (e.g., TiW, Aluminum, or other suitable conductive material) via conductive (e.g., aluminum or other suitable conductive material) input pads 414. In one embodiment, a metal reflector 418 (e.g., Aluminum or other suitably reflective material) may be disposed on the surface of the supporting substrate 490 and ROIC 492 to form a resonant cavity structure to enhance infrared absorptance in the membrane of the suspended microbolometer pixel structure 412. In one embodiment, detector element pixel size may range, for example, from about 12 microns by about 12 microns to about 100 microns by about 100 microns, although other sizes (having greater or lesser surface area) and/or shapes may be suitably employed.

Figure 4B:
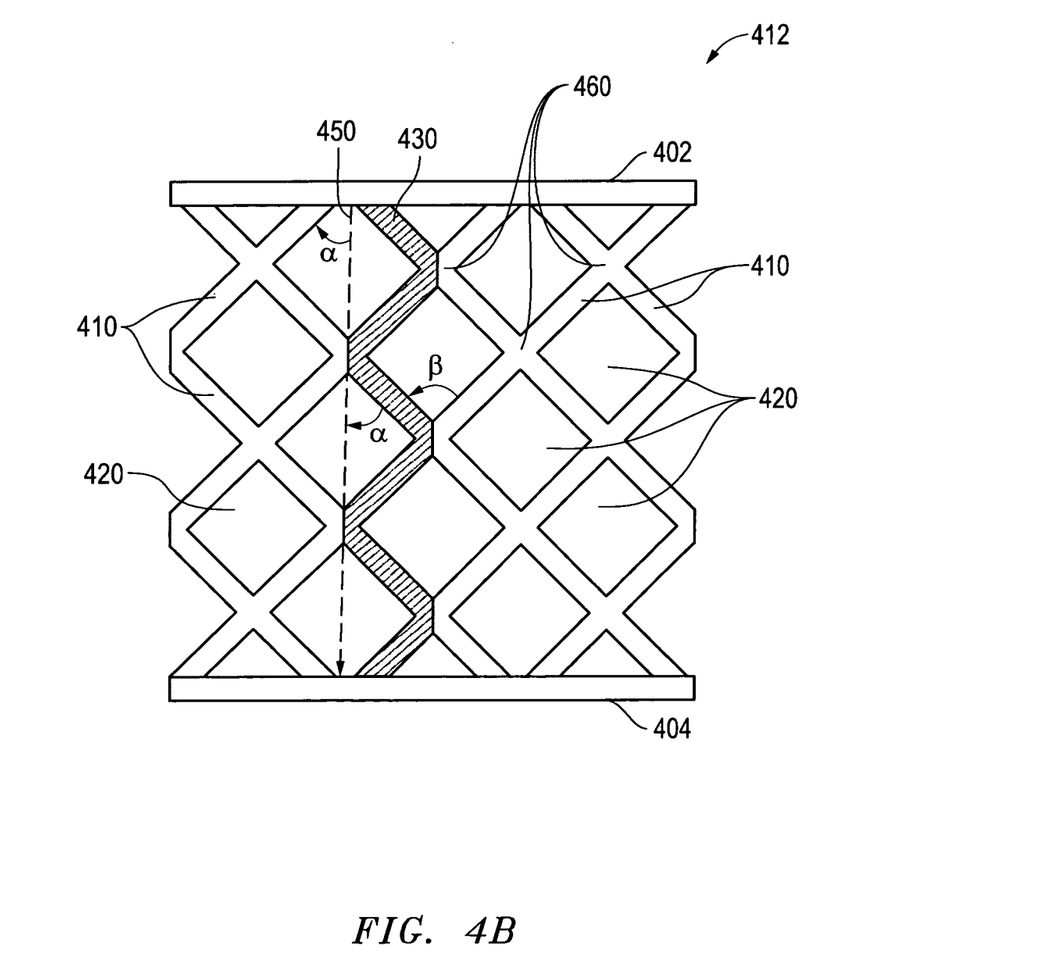
FIG. 4B is a simplified top view of a microbolometer detector element pixel structure according to one exemplary embodiment.

Referring now to FIG. 4B, a simplified top view of a suspended DRC microbolometer detector pixel element structure 400 of FIG. 4A is shown as it may be configured according to one exemplary embodiment with square-shaped membrane openings 420. The microbolometer detector structure 400 of this exemplary embodiment includes conductive element portions 410 that each have a longitudinal axis oriented at substantially the same acute angle α (in this case at an a of about 45 degrees) with respect to the overall direction of current flow 450 between electrical contacts 402 and 404 of microbolometer structure 400, and in this case such that the angle β that is formed between the longitudinal axis of adjacent conductive element portions 410 is about 90 degrees. In one embodiment, openings 420 may be dimensioned to be small (e.g., less than about 4 microns across or less than about 3 microns across) compared to the radiation wavelength of interest (e.g., about 10 microns). As shown, two adjacent current paths of substantially equal electrical resistance extend from each given intersection node 460 to each one of electrical contacts 402 or 404, so that both adjacent current paths conduct current in a substantially equal manner between the given node 460 and a respective one of contacts 402 or 404.

In the exemplary embodiment of FIGS. 4A and 4B, substantially the entire volume of electrically conductive membrane material between electrical contacts 402 and 404 contributes to conduction of current between contacts 402 and 404. In this exemplary embodiment, there are six equivalent zigzag conductive paths connecting the electrical contacts 402 and 404, although more than six such zigzag paths or fewer than such zigzag paths may be present in a given embodiment. As shown, each of these conductive paths are connected to one another at the vertices (nodes 460) of the zigzags, and one of these zigzag conductive paths 430 is denoted by cross-hatching in FIG. 4B. The ratio of electrically active conductive element volume to the total volume of conductive element material in the microbolometer membrane current path between the electrical contacts 402 and 404 of microbolometer structure 400 is about 1 (or about 100% of the total conductive element volume is electrically active). Thus, as so configured, the volume of electrically conductive material that is electrically active and contributes to electrical conduction between contacts 402 and 404 is substantially greater (i.e., more than 50% greater), and the 1/f noise therefore lower, than it is for the prior art configuration of FIGS. 1 and 3, despite the fact that the net electrical resistance and total physical volume of electrically conductive material is about the same.

It will be understood that the illustrated embodiment of FIGS. 4A-4B is exemplary only, and that openings may be provided in a microbolometer pixel membrane structure to form conductive element portions of any other geometrical shape and orientation relative to electrical contacts of a microbolometer structure that provides a greater ratio of electrically active conductive element volume to overall volume of conductive element material in the microbolometer membrane current path as compared to conventional microbolometer pixel structures such as illustrated in FIGS. 1 and 3. In this regard, multiple intersecting conductive element portions may be provided in any configuration to intersect with each other at intersecting nodes from which multiple current paths of substantially equal resistance extend to electrical contacts of a microbolometer pixel structure. Further it will be understood that the relative width and length of conductive element portions 410 as well as the size of openings 420 relative to conductive element portions 410, as shown in FIG. 4B, is exemplary only. Thus, for example, relative thicker and shorter conductive element portions, or relative thinner and longer conductive element portions, may be employed in other embodiments. In one embodiment, the number of conductive element portion sections (and hence the conductive portion length) within each current path is the same as within the other current paths of the same microbolometer pixel membrane structure.

Further, the angle between the longitudinal axis of conductive element portions and the overall direction of current flow between microbolometer electrical contacts in one embodiment may be selected to be any angle less than 90 degrees and greater than 0 degrees such that the conductive material volume of each of the conductive element portions is electrically active. In one exemplary embodiment, a microbolometer pixel membrane structure may be configured such that the ratio of electrically active conductive element volume to the total volume of conductive element material in the microbolometer membrane current path between the electrical contacts of a microbolometer structure is about 1 (or the total conductive element volume that is electrically active may be about 100%). In another exemplary embodiment, a microbolometer pixel membrane structure may be configured such that electrical current conduction in all portions (e.g., conductive element segments) of the microbolometer pixel membrane structure between the electrical contacts of the microbolometer structure is substantially equal, thus reducing noise.

Figure 5:
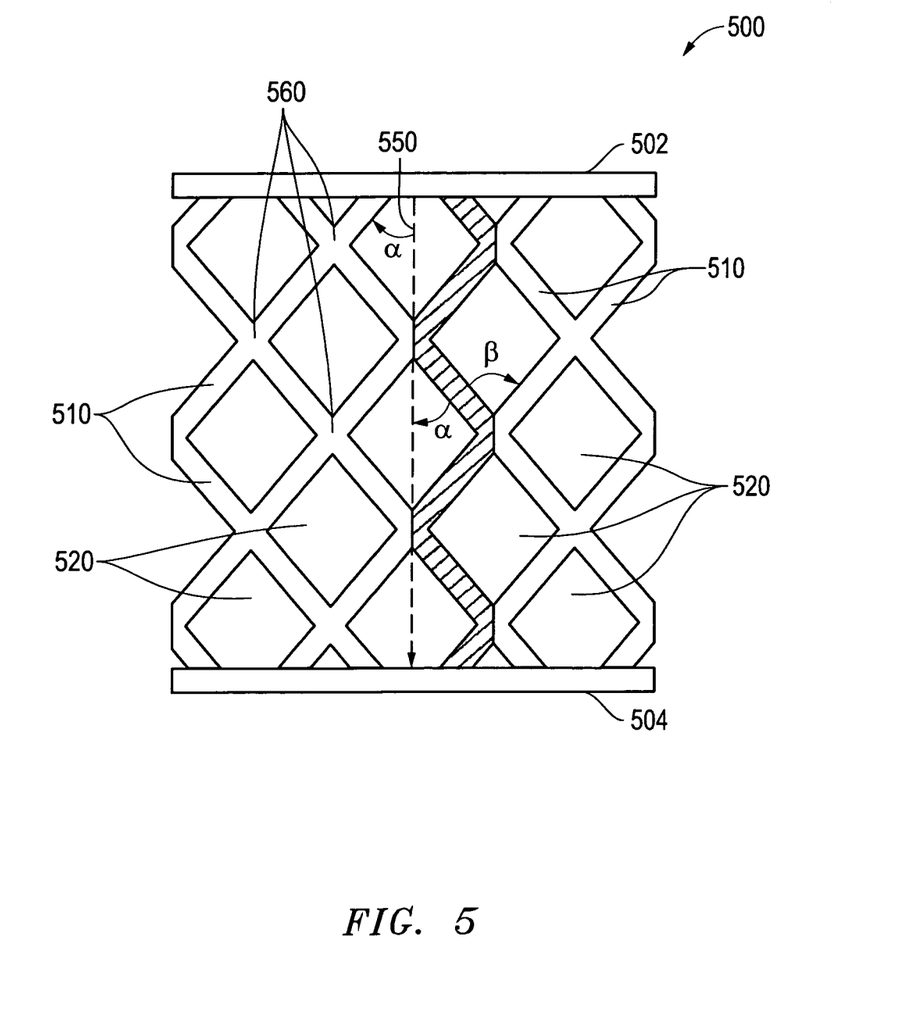
FIG. 5 is a simplified top view of a microbolometer detector element pixel structure according to one exemplary embodiment.

FIG. 5 illustrates a simplified top view of a suspended DRC microbolometer detector pixel element structure 500 as it may be configured according to another exemplary embodiment. The microbolometer detector structure 500 includes conductive element portions 510 that each have a longitudinal axis oriented at substantially the same acute angle α (in this case at an α of about 40 degrees) with respect to the overall direction of current flow 550 between electrical contacts 502 and 504 of microbolometer structure 500, and in this case such that the angle β that is formed between the longitudinal axis of adjacent conductive element portions 510 is about 80 degrees. As with the square-shaped openings of FIGS. 4A and 4B, longitudinally-oriented diamond or rhombus-shaped openings 550 may be dimensioned to be small compared to the radiation wavelength of interest. As shown, two adjacent current paths of equal electrical resistance extend from each given intersection node 560 to each one of electrical contacts 502 or 504, so that both adjacent current paths conduct current in a substantially equal manner between the given node 560 and a respective one of contacts 502 or 504.

As is the case with the embodiment of FIGS. 4A-4B, there are six equivalent zigzag conductive paths in FIG. 5 that connect the electrical contacts 502 and 504, and substantially the entire volume of electrically conductive membrane material between electrical contacts 502 and 504 of FIG. 5 contributes to conduction of current between contacts 502 and 504 such that the ratio of electrically active conductive element volume to the total volume of conductive element material in the microbolometer membrane current path between the electrical contacts 502 and 504 is about 1 (or about 100% of the total conductive element volume is electrically active).

Figure 6:
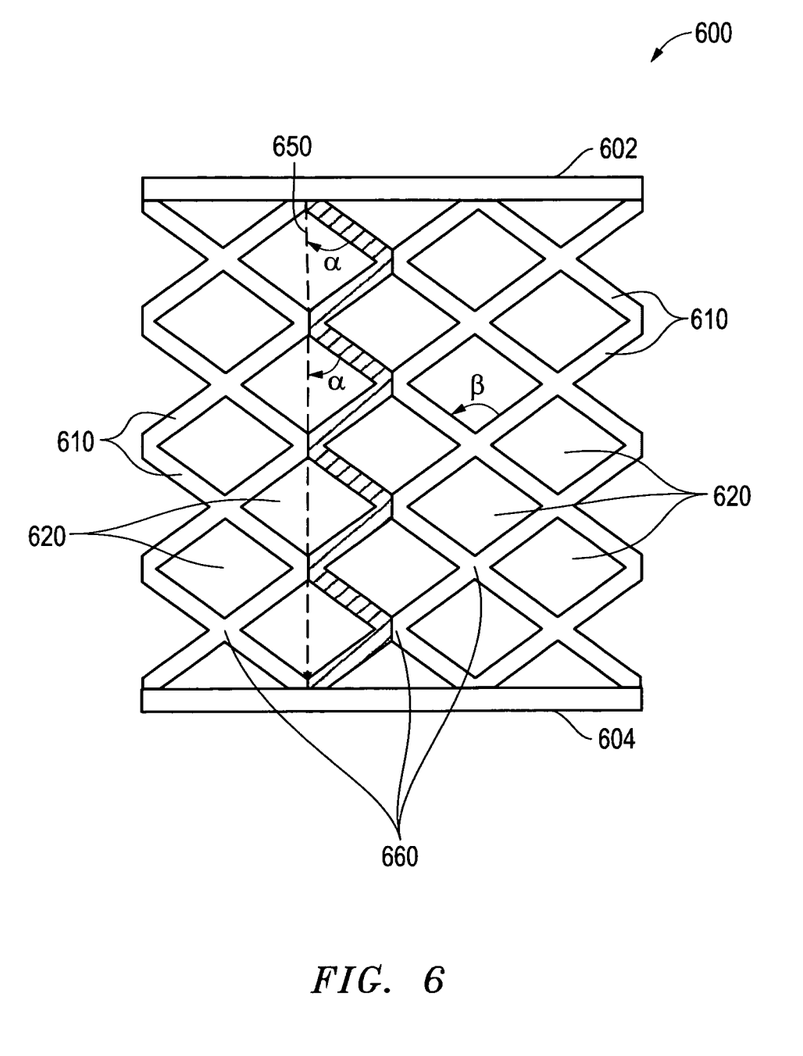
FIG. 6 is a simplified top view of a microbolometer detector element pixel structure according to one exemplary embodiment.

FIG. 6 illustrates a simplified top view of a suspended DRC microbolometer detector pixel element structure 600 as it may be configured according to another exemplary embodiment. The microbolometer detector structure 600 includes conductive element portions 610 that each have a longitudinal axis oriented at substantially the same acute angle α (in this case at an α of about 52.5 degrees) with respect to the overall direction of current flow 650 between electrical contacts 602 and 604 of microbolometer structure 600, and in this case such that the angle β that is formed between the longitudinal axis of adjacent conductive element portions 610 is about 105 degrees. As with the square-shaped openings of FIG. 4, laterally-oriented diamond or rhombus-shaped openings 650 may be dimensioned to be small compared to the radiation wavelength of interest. As shown, two adjacent current paths of equal electrical resistance extend from each given intersection node 660 to each one of electrical contacts 602 or 604, so that both adjacent current paths conduct current in a substantially equal manner between the given node 660 and a respective one of contacts 602 or 604.

As is the case with the embodiments of FIGS. 4 and 5, there are six equivalent zigzag conductive paths in FIG. 6 that connect the electrical contacts 502 and 504, and substantially the entire volume of electrically conductive membrane material between electrical contacts 602 and 604 of FIG. 6 contributes to conduction of current between contacts 602 and 604 such that the ratio of electrically active conductive element volume to the total volume of conductive element material in the microbolometer membrane current path between the electrical contacts 602 and 604 is about 1 (or about 100% of the total conductive element volume is electrically active).

It will be understood that all or only a portion of the conductive element portions of a microbolometer pixel membrane structure may be configured to provide increased volume of electrically active material. For example, every conductive element portion of a microbolometer membrane may be oriented at the same angle α relative to the overall direction of current flow between microbolometer electrical contacts. Alternatively, less than the entire length of adjacent and intersecting conductive element portions may be oriented at the same angle α relative to the overall direction of current flow between the microbolometer electrical contacts (i.e., to provide increased amount of electrically active conductive material over at least a portion of the current path between two electrical contacts of a microbolometer pixel structure).

Figure 7:
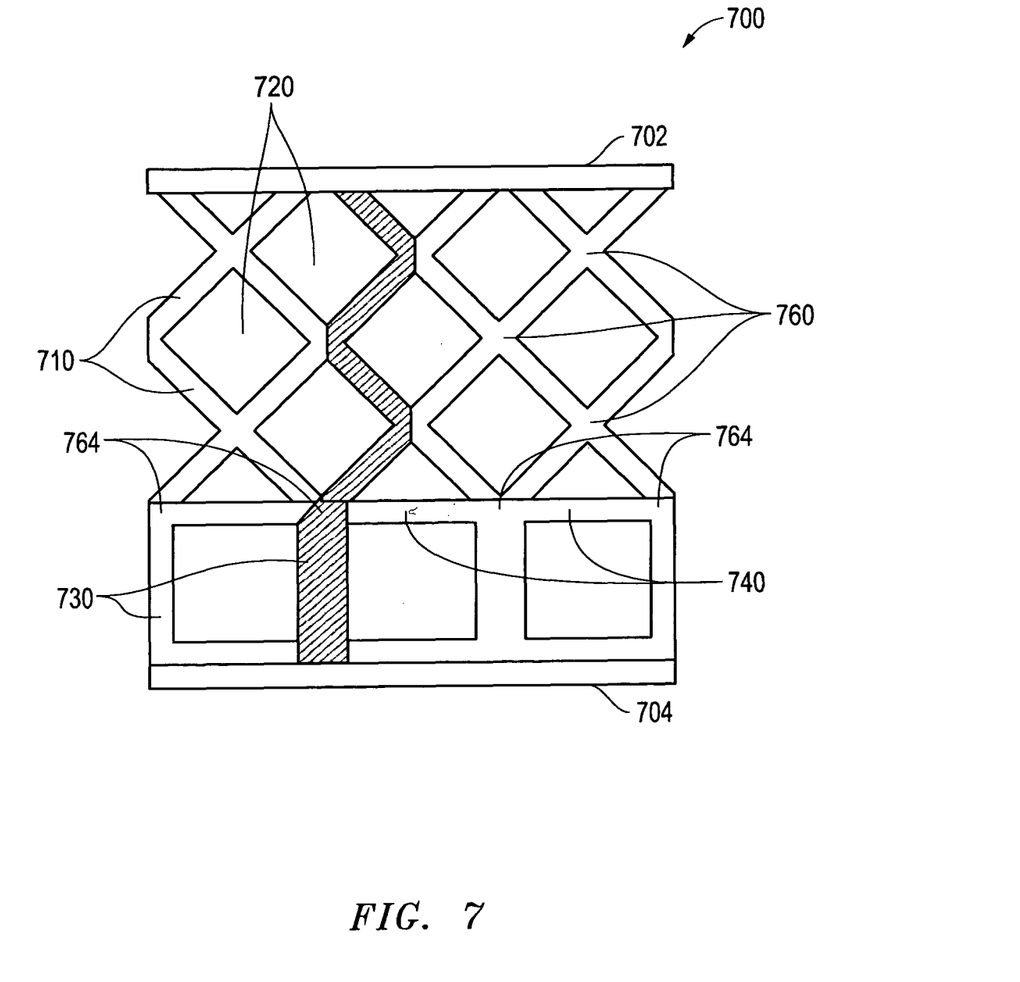
FIG. 7 is a simplified top view of a microbolometer detector element pixel structure according to one exemplary embodiment.

For example, FIG. 7 illustrates a simplified top view of a suspended DRC microbolometer detector pixel element structure 700 as it may be configured according to another exemplary embodiment with only a portion of the conductive element portions of a microbolometer pixel membrane structure configured to provide increased volume of electrically active material. The microbolometer detector structure 700 of this embodiment includes conductive element portions 710 that each have a longitudinal axis oriented at substantially the same acute angle with respect to the overall direction of current flow 550 between electrical contacts 702 and 704 of microbolometer structure 700 in the manner described in relation to FIG. 4 herein. However, microbolometer detector structure 700 also includes conductive element portions 730 oriented parallel to the overall direction of current flow between electrical contacts 702 and 704, and conductive element cross member portions 740 that are oriented perpendicular to the overall direction of current flow between electrical contacts 702 and 704. Thus, two adjacent current paths of equal electrical resistance extend from each given intersection node 760 to each one of electrical contacts 702 or 704, so that both adjacent current paths conduct current in a substantially equal manner between the given node 760 and a respective one of contacts 702 or 704. However, only one current path of least resistance exists between each given intersection node 764 to electrical contact 704. In this embodiment, the ratio of electrically active conductive element volume to the total volume of conductive element material in the microbolometer membrane current path between the electrical contacts 702 and 704 is less than 1 (or less than 100% of the total conductive element volume is electrically active).

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed microbolometer pixel structures may be utilized in various combinations and/or independently. Thus the invention is not limited to only those combinations shown herein, but rather may include other combinations.

What is claimed is:

1. A detector element, comprising:
a substrate that includes read out integrated circuitry (ROIC); and
a microbolometer pixel structure configured to absorb radiation, the microbolometer pixel structure comprising at least two spaced electrical contacts coupled to the ROIC, and an electrically conductive membrane material supported at a position spaced above the substrate and coupled to form a current path between the two spaced electrical contacts, the membrane material having multiple openings defined therein between the two spaced electrodes, and the openings configured such that greater than or equal to about 70% of the total volume of electrically conductive membrane material between the electrical contacts is electrically active;
wherein the electrically conductive membrane material comprises multiple intersecting conductive element portions oriented diagonally to the direction of the current flow between the microbolometer electrical contacts, each of the conductive element portions having a longitudinal axis, and the longitudinal axis of each of the conductive element portions being oriented at the same acute angle to the overall direction of current flow as are each other of the conductive element portions.

2. The detector element of claim 1, wherein the openings are configured such that that the ratio of electrically active conductive element volume to the total volume of conductive element material between the electrical contacts is about 1.

3. The detector element of claim 1, wherein the openings are configured such that substantially the entire volume of electrically conductive membrane material between the electrical contacts contributes to conduction of current between the electrical contacts.

4. The detector element of claim 1, wherein the conductive element portions intersect with each other at intersecting nodes, and multiple current paths of substantially equal resistance extend to the electrical contacts of the microbolometer pixel structure from each of the intersecting nodes.

5. The detector element of claim 1, wherein the microbolometer pixel structure comprises a diffractive resonant cavity (DRC) microbolometer pixel structure.

6. The detector element of claim 1, wherein the detector element is an uncooled infrared detector element.

7. A focal plane array assembly, comprising a plurality of detector elements of claim 1.

8. A detector element, comprising:
a substrate that includes read out integrated circuitry (ROIC); and
a microbolometer pixel structure configured to absorb radiation, the microbolometer pixel structure comprising at least two spaced electrical contacts coupled to the ROIC, and an electrically conductive membrane material supported at a position spaced above the substrate and coupled to form a current path between the two spaced electrical contacts, the membrane material having multiple openings defined therein between the two spaced electrodes, and the openings configured such that greater than or equal to about 70% of the total volume of electrically conductive membrane material between the electrical contacts is electrically active;
wherein the openings in the membrane material are defined therein between conductive element portions that each have a longitudinal axis oriented at substantially the same acute angle with respect to the overall direction of current flow between the two spaced electrical contacts as are each other of the conductive element portions in at least a portion of the current path such that substantially the entire volume of electrically conductive membrane material in at least a portion of the current path contributes to conduction of current between the electrical contacts.

9. A microbolometer pixel structure configured to absorb radiation, the microbolometer pixel structure comprising:
at least two spaced electrical contacts configured for coupling to read out integrated circuitry (ROIC) of a detector;
an electrically conductive membrane material coupled to form a current path between the two spaced electrical contacts, the membrane material having multiple openings defined therein between the two spaced electrodes, and the openings configured such that greater than or equal to about 70% of the total volume of electrically conductive membrane material between the electrical contacts is electrically active;

wherein the electrically conductive membrane material comprises multiple intersecting conductive element portions oriented diagonally to the direction of the current flow between the microbolometer electrical contacts, each of the conductive element portions having a longitudinal axis, and the longitudinal axis of each of the conductive element portions being oriented at the same acute angle to the overall direction of current flow as are each other of the conductive element portions.

10. The microbolometer pixel structure of claim 9, wherein the openings are configured such that that the ratio of electrically active conductive element volume to the total volume of conductive element material between the electrical contacts is about 1.

11. The microbolometer pixel structure of claim 9, wherein the openings are configured such that substantially the entire volume of electrically conductive membrane material between the electrical contacts contributes to conduction of current between the electrical contacts.

12. The microbolometer pixel structure of claim 9, wherein the conductive element portions intersect with each other at intersecting nodes, and multiple current paths of substantially equal resistance extend to the electrical contacts of the microbolometer pixel structure from each of the intersecting nodes.

13. The microbolometer pixel structure of claim 9, wherein the microbolometer pixel structure comprises a diffractive resonant cavity (DRC) microbolometer pixel structure.

14. The microbolometer pixel structure of claim 9, wherein the microbolometer pixel structure is configured to absorb infrared radiation.

15. A microbolometer pixel structure configured to absorb radiation, the microbolometer pixel structure comprising:
at least two spaced electrical contacts configured for coupling to read out integrated circuitry (ROIC) of a detector;
an electrically conductive membrane material coupled to form a current path between the two spaced electrical contacts, the membrane material having multiple openings defined therein between the two spaced electrodes, and the openings configured such that greater than or equal to about 70% of the total volume of electrically conductive membrane material between the electrical contacts is electrically active;
wherein the openings in the membrane material are defined therein between conductive element portions that each have a longitudinal axis oriented at substantially the same acute angle with respect to the overall direction of current flow between the two spaced electrical contacts as are each other of the conductive element portions in at least a portion of the current path such that substantially the entire volume of electrically conductive membrane material in at least a portion of the current path contributes to conduction of current between the electrical contacts.

16. A method of making a focal plane array assembly, comprising:
providing a substrate including read out integrated circuitry (ROIC);
forming a plurality of detectors on the substrate, each of the detectors including a microbolometer pixel structure comprising at least two spaced electrical contacts coupled to the ROIC and an electrically conductive membrane material supported at a position spaced above the substrate and coupled to form a current path between the two spaced electrical contacts; and
forming multiple openings in the membrane structure of each of the plurality of microbolometer pixel structures, the multiple openings being formed between the two spaced electrodes of each respective microbolometer pixel structure and configured such that greater than or equal to about 70% of the total volume of electrically conductive membrane material between the electrical contacts of each respective microbolometer pixel structure is electrically active;
wherein the method further comprises forming multiple openings in the membrane structure of each of the plurality of microbolometer pixel structures such that the electrically conductive membrane material comprise multiple intersecting conductive element portions oriented diagonally to the direction of the current flow between the microbolometer electrical contacts, and such that each of the conductive element portions has a longitudinal axis that is oriented at the same acute angle to the overall direction of current flow as are each other of the conductive element portions.

17. The method of claim 16, wherein the openings of each respective microbolometer pixel structure are configured such that that the ratio of electrically active conductive element volume to the total volume of conductive element material between the electrical contacts of the respective microbolometer pixel structure is about 1.

18. The method of claim 16, wherein the openings of each respective microbolometer pixel structure are configured such that substantially the entire volume of electrically conductive membrane material between the electrical contacts of the respective microbolometer pixel structure contributes to conduction of current between the electrical contacts.

19. The method of claim 16, further comprising forming multiple openings in the membrane structure of each of the plurality of microbolometer pixel structures such that substantially the entire volume of electrically conductive membrane material between the electrical contacts contributes to conduction of current between the electrical contacts such that the ratio of electrically active conductive element volume to the total volume of conductive element material between the electrical contacts is about 1.

20. The method of claim 16, further comprising forming multiple openings in the membrane structure of each of the plurality of microbolometer pixel structures such that the electrically conductive membrane material comprises multiple intersecting conductive element portions that intersect with each other at intersecting nodes, and such that multiple current paths of substantially equal resistance extend to the electrical contacts of the microbolometer pixel structure from each of the intersecting nodes.

21. The method of claim 16, further comprising forming multiple openings in the membrane structure of each of the plurality of microbolometer pixel structures such that the electrically-active volume of conductive material between the electrical contacts of the membrane structure of each microbolometer structure is reduced proportionally with the decrease in total physical volume of conductive membrane material in the microbolometer structure.

22. The method of claim 16, wherein each of the plurality of microbolometer pixel structures comprises a microbolometer infrared detector structure.

23. The method of claim 16, wherein each of the plurality of microbolometer pixel structures comprises a diffractive resonant cavity (DRC) microbolometer structure.

24. A method of making a focal plane array assembly, comprising:

provpiding a substrate including read out integrated circuitry (ROIC);

forming a plurality of detectors on the substrate, each of the detectors including a microbolometer pixel structure comprising at least two spaced electrical contacts coupled to the ROIC and an electrically conductive membrane material supported at a position spaced above the substrate and coupled to form a current path between the two spaced electrical contacts; and forming multiple openings in the membrane structure of each of the plurality of microbolometer pixel structures, the multiple openings being formed between the two spaced electrodes of each respective microbolometer pixel structure and configured such that greater than or equal to about 70% of the total volume of electrically conductive membrane material between the electrical contacts of each respective microbolometer pixel structure is electrically active;

wherein the openings in the membrane material of each respective microbolometer pixel structure are defined therein between conductive element portions that each have a longitudinal axis oriented at substantially the same acute angle with respect to the overall direction of current flow between the two spaced electrical contacts of the respective microbolometer pixel structure as are each other of the conductive element portions in at least a portion of the current path of the respective microbolometer pixel structure such that substantially the entire volume of electrically conductive membrane material in at least a portion of the current path of the respective microbolometer pixel structure contributes to conduction of current between the electrical contacts of the respective microbolometer pixel structure.

* * * * *